Figure 1:
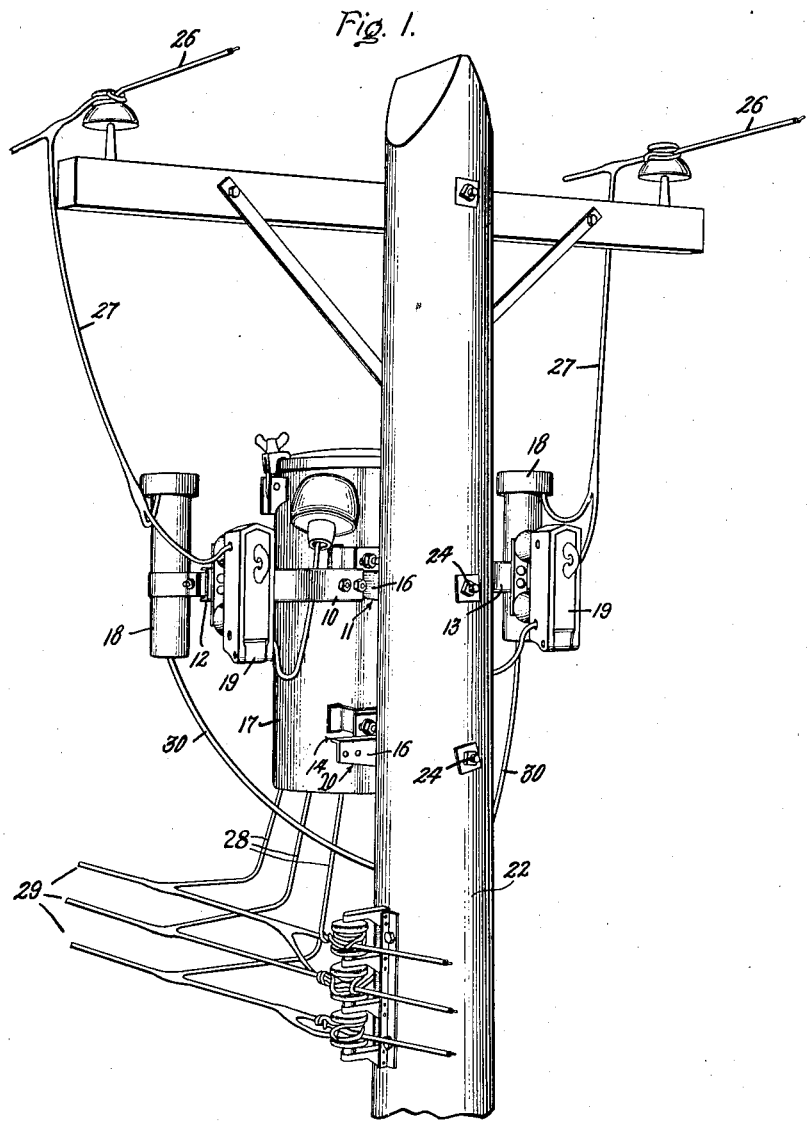

Inventor:
Harry M. Acly,
by Charles... 
His Attorney.

July 12, 1932.    H. M. ACLY    1,867,394
SUPPORT FOR TRANSFORMERS AND ASSOCIATED PROTECTIVE APPARATUS
Filed Jan. 30, 1932    2 Sheets-Sheet 2
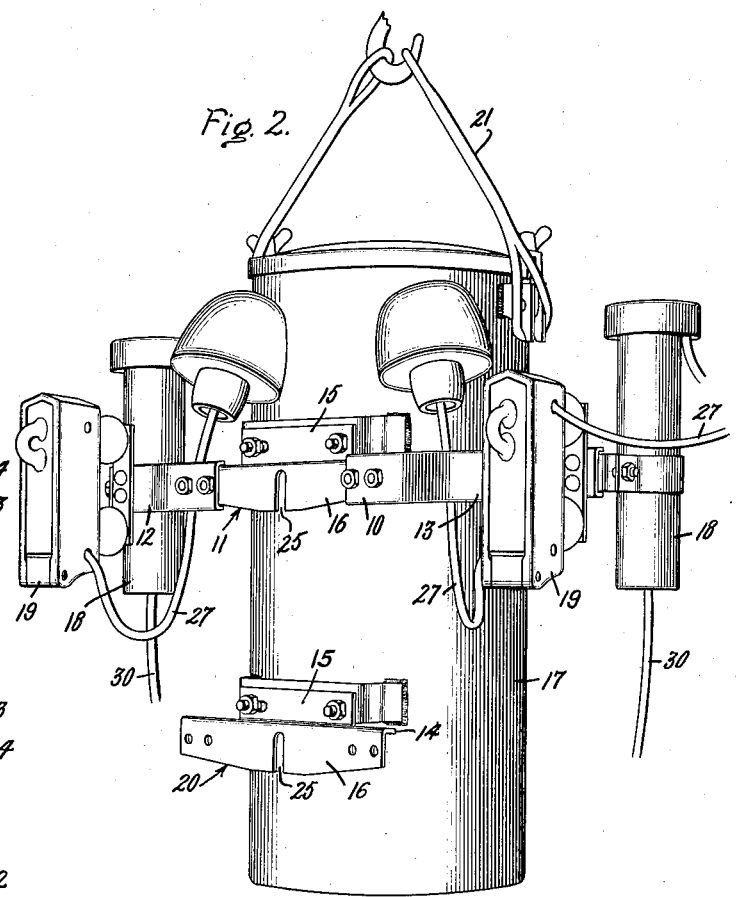
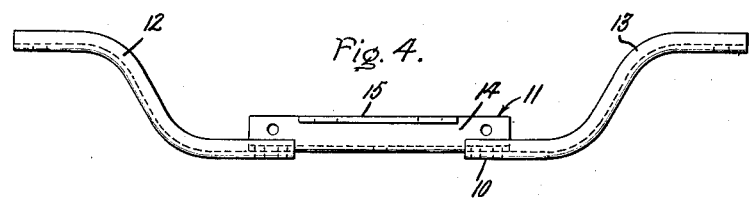
Inventor:
Harry M. Acly,
by Charles E. Mullen
His Attorney.

Patented July 12, 1932

1,867,394

UNITED STATES PATENT OFFICE

HARRY M. ACLY, OF PITTSFIELD, MASSACHUSETTS, ASSIGNOR TO GENERAL ELECTRIC COMPANY, A CORPORATION OF NEW YORK

SUPPORT FOR TRANSFORMERS AND ASSOCIATED PROTECTIVE APPARATUS

Application filed January 30, 1932. Serial No. 589,915.

My invention relates to supports for transformers and associated protective apparatus such as fuse cutouts and lightning arresters which are commonly mounted together in elevated positions on poles and connected to electrical transmission and distribution lines carried by the poles. Transformers and associated protective apparatus have been mounted in elevated positions on poles and on cross arms supported by poles and it has been customary to raise separately each transformer and each piece of the apparatus associated with it to the desired positions and to secure each device separately in place. This has required much of the installation work to be done by workmen on the poles where the work could not be done conveniently. The general object of the present invention is to provide an improved support for a transformer and associated protective apparatus whereby the support with its transformer and associated protective devices may be conveniently assembled as a unit on the ground and then raised and secured in position on a pole.

Other objects and advantages will appear from the following description taken in connection with the accompanying drawings in which Fig. 1 shows a transformer with associated protective apparatus secured to a common support and mounted on a pole in accordance with the invention; Fig. 2 shows the transformer and its protective apparatus mounted on the common support ready to be secured to a pole; Fig. 3 shows a section of a pole prepared to receive the support carrying the transformer and protective apparatus, and Fig. 4 is a view of the support.

Like reference characters indicate similar parts in the different figures of the drawings.

The improved support 10 includes an inner portion 11 and two outer portions or extensions 12 and 13 detachably bolted to the ends of the inner portion 10. The inner portion 11 of the support is formed of flat sheet metal and includes a horizontal longitudinal part 14 with its opposite edges bent in opposite directions to form integral, parallel, vertical flanges 15 and 16. The transformer 17 is secured by bolts to the upper flange 15 so that the lower flange 16 is spaced from the transformer by the horizontal part 14 of the support. A lightning arrester 18 and a series fuse cutout 19 are secured by bolts to the outer end portion of each of the extensions 12 and 13 of the support. Another support 20 is secured to the transformer below the support 10. This support 20 has two spaced vertical flanges 15 and 16 connected by a horizontal part 14 and may be otherwise identical with the inner section 11 of the upper support 10. The upper flange 15 of the lower support is secured to the transformer by bolts. The supports 10 and 20 and the transformer 17 and protective devices 18 and 19 may all be conveniently secured together as a unit by workmen on the ground or in any other convenient place. The two extensions 12 and 13 of the support 10 may be alike as well as the support 20 and the inner section 11 of the support 10 so that only two different parts are necessary for both supports.

After the transformer and its protective devices have been secured to their supports, the whole assembly may be raised by a sling 21 to a position beside a pole 22 from which the assembly is to be suspended. The pole is provided with gains 23 spaced to receive the supports 10 and 20 and bolts 24 are passed through the pole at the gains. The supports 10 and 20 are moved close to the pole and slightly above the bolts and then lowered onto the bolts with the headed ends of the bolts engaging open slots 25 in the lower flanges 16 of the two supports. The opposite ends of the bolts 24 at the other side of the pole are provided with nuts and washers with which the bolts are tightened to draw the supports 10 and 20 firmly against the pole and into the gains 23.

The extensions 12 of the support 10 have their edges flanged to make them rigid and strong and their outer ends are offset toward the transformer side of the support, as shown most clearly in Fig. 4. This offsetting of the outer ends of the extensions 12 carries the protective devices further from the side of the pole opposite the transformer so that it will be more convenient and safe for workmen climbing and working on the pole.

After the transformer and its protective devices have been suspended and secured in place on the pole, the high voltage supply circuit 26 is connected by conductors 27 through the fuse cutouts 19 to the high voltage side of the transformer. The low voltage side of the transformer is connected by conductors 28 to a low voltage distribution circuit 29. The high voltage conductors 26 and 27 are also connected through the lightning arresters 18 to grounded conductors 30 extending down the pole to a suitable ground.

The invention has been explained by describing and illustrating a particular form and application thereof but it will be apparent that changes may be made without departing from the spirit of the invention and the scope of the appended claims.

What I claim as new and desire to secure by Letters Patent of the United States is:

1. A transformer assembly for pole suspension, said assembly including a metal support with two spaced flanges, a transformer secured to one of said flanges, the other flange having an open slot, and a headed bolt, the headed end of the bolt engaging said open slot to secure the transformer assembly to the pole.

2. A transformer and protective assembly for pole suspension, said assembly including a metal supporting member with two spaced flanges, an extension secured to one end of said supporting member, a transformer secured to one of said flanges, means for securing the other flange to a pole, and protective devices secured to the outer end portion of said extension.

3. A transformer and protective assembly for pole suspension, said assembly including a metal supporting member with two spaced flanges, a metal extension secured to one end of said supporting member, a transformer secured to one of said flanges, means for securing the other flange to a pole, and protective devices secured to the outer end portion of said extension, said outer end portion of the extension being offset toward the transformer side of said supporting member.

4. A transformer and protective assembly for pole suspension, said assembly including two like supporting members formed of metal, each member including two spaced flanges, a transformer secured to one flange of each member, means for securing the other flange of each member to a pole, two like metal extensions secured to the opposite ends of one of said members, and protective devices secured to the outer end portions of said extensions, said outer end portions of the extensions being offset toward the transformer side of said supporting members.

5. A support for suspending a transformer and protective devices from a pole, said support including an inner metal member having two flanges, one of said flanges having an open slot to engage a bolt for securing the support to a pole, and metal extensions secured to the opposite ends of said inner metal member for supporting protective devices at their outer end portions, the outer end portions of said extensions being offset away from the slotted flange side of said inner metal member.

In witness whereof, I have hereunto set my hand.

HARRY M. ACLY.